United States Patent
Pantone et al.

(10) Patent No.: US 6,384,130 B1
(45) Date of Patent: *May 7, 2002

(54) LIQUID, HYDROPHOBIC, NON-MIGRATING, NON-FUNCTIONAL POLYURETHANE PLASTICIZERS

(75) Inventors: Richard S. Pantone, New Martinsville, WV (US); Peter H. Markusch, McMurray, PA (US)

(73) Assignee: Bayer Corporation, Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/453,970

(22) Filed: Dec. 3, 1999

(51) Int. Cl.$^7$ .............................. C08J 3/00; C08K 3/20; C08L 75/00; C08G 18/00; C08G 18/71
(52) U.S. Cl. ...................... 524/590; 524/198; 524/199; 524/589; 528/44; 528/69
(58) Field of Search ................................ 524/198, 199, 524/589, 590; 528/44, 69

(56) References Cited

U.S. PATENT DOCUMENTS

| | | | |
|---|---|---|---|
| 4,123,413 A | 10/1978 | Mark et al. | 260/32.6 NR |
| 4,242,468 A | 12/1980 | Baack et al. | 521/170 |
| 4,482,408 A | 11/1984 | Stephens et al. | 149/19.4 |
| 4,824,888 A | 4/1989 | Emmerling et al. | 524/199 |
| 5,525,654 A | 6/1996 | Podola et al. | 524/199 |
| 6,218,462 B1 * | 4/2001 | Pantone et al. | 524/590 |

OTHER PUBLICATIONS

Database WPI, Section Ch, Week 198712, Derwent Publicatons Ltd., London, GB; AN 1987–083477, XP002160816 & JP 62 034932 A (Sanyo Chem Ind Ltd), Feb. 14, 1987, Abstract.

Database WPI, Section Ch, Week 198932, Derwent Publications Ltd., London, GB; AN 1989–230808, XP002160817 & JP 01 165489 A (Riso Chemical Ind KK), Jun. 29, 1989, Abstract.

* cited by examiner

*Primary Examiner*—Patrick D. Niland
(74) *Attorney, Agent, or Firm*—Joseph C. Gil; N. Denise Brown

(57) ABSTRACT

This invention relates to liquid, hydrophobic, non-migrating, non-functional polyurethane plasticizers. These plasticizers comprise the reaction product of an isocyanate-terminated prepolymer and a monofunctional alcohol having a molecular weight of about 32 to about 1,000. The isocyanate-terminated prepolymers comprise the reaction product of a diisocyanate and at least one hydrophobic polyol. The present invention also relates to a process for the production of the liquid, hydrophobic, non-migrating, non-functional polyurethane plasticizers. This invention also relates to a process for the production of a polyurethane product comprising reacting at least one polyisocyanate component with at least one isocyanate-reactive component, in the presence of these liquid, hydrophobic, non-migrating, non-functional polyurethane plasticizers, and to the resultant polyurethane products of this process.

31 Claims, No Drawings

LIQUID, HYDROPHOBIC, NON-MIGRATING, NON-FUNCTIONAL POLYURETHANE PLASTICIZERS

BACKGROUND OF THE INVENTION

This invention relates to liquid, hydrophobic, non-migrating, non-functional polyurethane plasticizers. It is also directed to a process for the production of these plasticizers, a process for the production of a polyurethane comprising the reaction between an isocyanate component and an isocyanate-=reactive component in the presence of these plasticizers, and to the polyurethanes produced by that process.

Plasticizers are generally used in plastics (i.e., PVC) to adjust hardness, flexibility and processing characteristics. Plasticizers are also used in commercial polyurethane elastomer formulations to provide products exhibiting higher flexibility, lower hardness, and lower rebound resulting in increased energy absorption. However, these products can potentially embrittle over time due to migration of the plasticizer. Plasticizers that have a minimal effect on hardness and physical properties, and which are non-migrating are desirable for polyurethane elastomers prepared by a one-shot cast elastomer process.

Diurethanes are known and described as suitable stabilizing additives for sealing compounds, in, for example, U.S. Pat. No. 4,824,888 and as plasticizers for polyurethane based sealing and adhesive compositions in U.S. Pat. No. 5,525,654.

U.S. Pat. No. 4,824,888 discloses diurethanes which correspond to one of two general formulas, which are useful as stabilizing additives in sealing compounds based on isocyanate-terminated prepolymers of difunctional and trifunctional polyether or polyester polyols and/or polyvinylchloride swellable copolymers of vinyl chloride with monomers from the group vinyl acetate, vinyl propionate and alkyl acrylates. These diurethanes are reaction products of monofunctional alcohols and diisocyanates. In particular, the monoalcohols are monofunctional polypropylene glycol monoalkyl ethers having a molecular weight of about 500 to 2000. These diurethanes are also suitable stabilizing agents for isocyanate-terminated polyurethane prepolymers, and for polyvinyl chloride homopolymer or copolymer plastisols.

Moisture curing sealing and/or adhesive compositions based on alkoxysilane-terminated polyurethanes which contain diurethanes as plasticizers are described by U.S. Pat. No. 5,525,654. These diurethanes are prepared from either diol mixtures and monofunctional isocyanates wherein substantially all the free hydroxyl groups are reacted, or from diisocyanates and monofunctional alcohols wherein substantially all the free isocyanate groups are reacted.

Other urethane plasticizers are disclosed in, for example, U.S. Pat. Nos. 4,123,413 and 4,482,408. The urethane plasticizers of U.S. Pat. No. 4,123,413 correspond to one of three general formulas, and are prepared by reaction of an alcohol or a phenol with an isocyanate, from amines and chloroformates, or from chloroformamides and alcohols or phenols in the presence of acid binding agents.

The urethane plasticizer of U.S. Pat. No. 4,482,408 is octyldecylbutyl urethane and is prepared by reacting an equimolar mixture of octyldecyl isocyanate and n-butyl alcohol. This urethane plasticizer is a mono-urethane described as a straight-chain, saturated, carbamic acid ester and is suitable as a plasticizer for propellant compositions with problems of plasticizer migration which typically occur during propellant storage.

Useful polyurethane plasticizers according to the present invention are based on isocyanate-terminated prepolymers reacted with monoalcohols or mixtures of monoalcohols. They are prepared by either adding the alcohols to the prepolymer or by addition of the prepolymer to the monofunctional alcohol(s). Most hydrophobic, non-functional polyurethane plasticizers are viscous liquids at 25° C. but usually exhibit viscosities of less than about 100,000 mPa·s at 50° C. The resulting polyurethanes do not contain any free hydroxyl- or isocyanate-groups, and thus they are non-reactive and can be added to either isocyanates or polyols to form stable mixtures.

The use of these polyurethane plasticizers in one-shot polyurethane elastomers has several important benefits:
1) Addition to either the polyol or the isocyanate composition allows one to adjust the mix ratio very favorably, i.e., to adjust a 1:1.5 ratio to an easier to process ratio of 1:1.
2) Addition to either the polyol or the isocyanate compositions allows one to adjust the viscosities of the two components very favorably, i.e., to obtain viscosities which are similar which facilitates the mixing process.
3) Unmodified polyisocyanates that contain no urethane, allophanate, urea, or biuret groups are usually very incompatible with polyol compositions due to major differences in surface energy (i.e., polarity). Addition of the diurethane containing plasticizers according to the invention to either the polyisocyanate or both the polyisocyanate and polyol side of one-shot elastomer formulations helps to overcome these incompatibility problems and thus facilitates mixing.

Although it is possible in one-shot elastomer formulations to meter the single components separately and mix them, i.e., in a reactor or mixhead, it is preferred to combine the liquid, hydrophobic, polyurethane containing plasticizer with the polyisocyanate and/or the polyol/chain extender blend (or individual components) prior to mixing the isocyanate containing the isocyanate reactive polyol components.

Besides the processing advantages polyurethane plasticizers provide in one-shot polyurethane elastomer formulations, they do not show any substantial migration or lower the physical properties of the final polyurethane elastomer upon aging to the extent observed in state of the art non-urethane group containing plasticizers. As a result, the high performance properties of one-shot polyurethane elastomers are effected minorly when polyurethane containing plasticizers are used in the formulation.

SUMMARY OF THE INVENTION

This invention relates to liquid, hydrophobic, non-migrating, non-functional polyurethane plasticizers having a viscosity of less than about 100,000 mPa·s, preferably less than about 20,000, at 50° C. These plasticizers comprise the reaction product of (1) an isocyanate-terminated hydrophobic prepolymer having an NCO group content of less than 20%, and (2) a monofunctional alcohol having a molecular weight of about 32 to about 1,000, preferably of about 128 to about 720, most preferably about 128 to about 300, and an OH number of about 56 to about 1750, preferably of about 78 to about 438, most preferably of about 187 to about 438; wherein components (1) and (2) are present in equivalent ratios to form the resultant liquid, hydrophobic polyurethane plasticizers. The resultant plasticizers have a ratio of carbon atoms to oxygen atoms of at least 6:1, preferably of at least 7:1, and most preferably of at least 8:1.

As used herein, the phrase liquid, hydrophobic, non-migrating, non-functional, polyurethane plasticizers refers to liquid polyurethane oligomers having a carbon to oxygen ratio of at least 6:1, which lack the affinity to absorb water, and do not have any functional groups to react with isocyanates or polyols (i.e. do not contain free isocyanate groups or Zerewittinov active hydrogens). The polyurethane oligomers have average molecular weights in the range of from about 500 to about 3,000, preferably about 600 to about 1,500.

Suitable (1) hydrophobic isocyanate-terminated prepolymers comprise the reaction product of (a) a diisocyanate component having an NCO group content of about 25.0% to about 60.0%, preferably of about 32% to about 50%, and a functionality of about 2.0; with (b) at least one hydrophobic polyol having a molecular weight of about 200 to about 4,000, preferably of about 400 to about 2,000, an OH number of about 28 to about 561, preferably about 56 to about 280, and a functionality of from about 1.8 to about 3.0, preferably about 2.0 to about 2.2, and wherein the hydrophobic polyol contains only carbon atoms in the backbone of the molecule. The relative amounts of diisocyanate and hydrophobic polyol are such that the NCO:OH equivalent ratio is from about 2:1 to about 7:1, and preferably from about 3:1 to about 5:1.

This invention also relates to a process for the production of these liquid, hydrophobic, non-migrating, non-functional polyurethane plasticizers that are characterized by a viscosity of less than about 100,000 mPa·s (preferably less than about 20,000 mPa·s) at 50° C. This process comprises:
(1) reacting
  (a) a diisocyanate component having an NCO group content of about 25.0% to about 60.0%, preferably of about 32% to about 50%, and a functionality of about 2.0,
  with
  (b) at least one hydrophobic polyol having a molecular weight of about 200 to about 4,000, preferably of about 400 to about 2,000, an OH number of about 28 to about 561, preferably of about 56 to about 280, and a functionality of from about 1.8 to about 3.0, preferably about 2.0 to about 2.2, and which contains only carbon atoms in the backbone of the molecule;
  at an NCO:OH equivalent ratio of from about 2:1 to about 7:1 to form an isocyanate-terminated prepolymer having an NCO group content of less than about 20%;
and
(2) reacting the isocyanate-terminated prepolymer formed in
  (1) above with
  (c) a monofunctional alcohol having a molecular weight of about 32 to about 1,000, preferably of about 128 to about 720, and an OH number of about 56 to about 1750, preferably of about 78 to about 438.

This present invention also relates to a process for the production of a polyurethane, comprising reacting a polyisocyanate component with an isocyanate-reactive component in the presence of these liquid, hydrophobic, non-migrating, non-functional polyurethane plasticizers, as well as to the polyurethanes produced by this process.

DETAILED DESCRIPTION OF THE INVENTION

In accordance with the present invention, the liquid, hydrophobic, non-migrating, non-functional polyurethane plasticizers are characterized by a viscosity of less than about 100,000 mPa·s, preferably less than about 20,000 mPa·s, at 50° C., and have a carbon to oxygen ratio of at least 6:1, preferably of at least 7:1, most preferably of at least 8:1.

Suitable liquid, hydrophobic, non-migrating, non-functional polyurethane plasticizers for the present invention comprise the reaction product of (1) an isocyanate-terminated prepolymer having an NCO group content of less than about 20%, and (2) a monofunctional alcohol having a molecular weight of about 32 to about 1,000, and an OH number of about 56 to about 1750.

Liquid, hydrophobic, non-migrating, non-functional polyurethane plasticizers can be prepared by, for example, the so-called "standard method" of addition. In this method, the hydrophobic isocyanate-terminated prepolymer is formed in a first step by the reaction of the diisocyanate component with at least one hydrophobic polyol in the relative ratios as described hereinabove. Then, the monoalcohol component is added to the isocyanate-terminated prepolymer in a second step, thereby forming the liquid, hydrophobic, non-migrating, non-functional polyurethane plasticizer which has a viscosity of less than about 100,000 mPa·s at 50° C.

Suitable isocyanate-terminated prepolymers to be used as component (1) are those isocyanate-terminated prepolymers which comprise the reaction product of (a) a diisocyanate component having an NCO group content of about 25.0 to about 60.0%, and a functionality of about 2.0; and (b) at least one hydrophobic polyol having a molecular weight of about 200 to about 4,000, preferably of about 400 to about 2,000, and OH number of about 28 to about 561, preferably about 56 to about 280, and a functionality of from about 1.8 to about 3.0, preferably about 2.0 to about 2.2. The diisocyanate component and the hydrophobic polyol are present in amounts such that the NCO:OH equivalent ratio is from about 2:1 to about 7:1, preferably from about 3:1 to about 5:1.

Suitable diisocyanates for forming the isocyanate-terminated prepolymers of the present invention include those having an NCO group content of about 25.0% to about 60.0%, preferably about 32% to about 50%, and a functionality of about 2.0. Mixtures of these diisocyanates are also suitable for the present invention.

Suitable monomeric diisocyanates may be represented by the formula R(NCO)$_2$ in which R represents an organic group obtained by removing the isocyanate groups from an organic diisocyanate having a molecular weight of about 56 to 1,000, preferably about 84 to 400. Diisocyanates preferred for the process according to the invention are those represented by the above formula in which R represents a divalent aliphatic, hydrocarbon group having 4 to 12 carbon atoms, a divalent cyclo-aliphatic hydrocarbon group having 6 to 13 carbon atoms, a divalent aralphatic hydrocarbon group having 7 to 20 carbon atoms, or a divalent aromatic hydrocarbon group having 6 to 18 carbon atoms. Preferred monomeric diisocyanates are those wherein R represents an aromatic hydrocarbon group.

Examples of the suitable organic diisocyanates include 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3- and -1,4-diisocyanate, 1-isocyanato-2-isocanatomethyl cyclopentane, 1-isocyanato-3-isocyanatomethyl-3,5,5-trimethyl-cyclohexane (isophorone diisocyanate or IPDI), bis(4-isocyanatocyclohexyl) methane, 2,4'- and/or 4,4'-dicyclohexylmethane diisocyanate, 1,3- and 1,4-bis(isocyanatomethyl) cyclohexane, bis(4-isocyanato-3-methyl-cyclohexyl) methane, α,α,α',α'-tetramethyl-1,3- and/or -1,4-xylylene diisocyanate, 1-isocyanato-1-methyl-4(3)-isocyanatomethyl cyclohexane, 2,4- and/or 2,6-hexahydrotoluene diisocyanate, 1,3- and/or 1,4-phenylene diisocyanate, 2,4- and/or 2,6-hexahydrotoluene diisocyanate, 1,3- and/or 1,4-phenylene diisocyanate, 2,4- and/or 1,6-toluene diisocyanate, 2,4'- and/or 4,4'-diphenylmethane diisocyanate, 1,5-diisocyanato naphthalene and mixtures thereof.

Suitable hydrophobic polyols to be used in forming the isocyanate-terminated prepolymers of the present invention include those having a molecular weight of about 200 to about 4,000, preferably about 400 to about 2,000, an OH number of about 28 to about 561, preferably about 56 to about 280, and a functionality of about 1.8 to about 3.0, preferably about 2.0 to about 2,2, and more preferably about 2.0. The hydrophobic polyols suitable for use in accordance with the invention are known and may be prepared by, for example, polymerization of alkenes (i.e., ethylene, propylene, butylene) and hydroxy functional alkenes (i.e., hydroxy butylene). Also suitable are oleo chemical polyols such as those described, for example, in DE 4041119, DE 4232167, PCT/WO 97/09363, PCT/WO 997/19141, PCT WO 95/0727, and in U.S. Pat. Nos. 4,551,517, 4,742,087, 4,977,207, and U.S. Pat. No. 5,302,626, the disclosures of which are herein incorporated by reference. Other suitable hydrophobic polyols include modified castor oils as known and described in the art. Modified castor oils such as these may also be referred to as polyesterether polyols and may be prepared by either blending castor oil with one or more polyether polyols, or by reacting castor oil with one or more polyether polyols. Hydrophobic polyols suitable for the present invention also include Henkel's dimer acid ($C_{36}$) derivatives as described in more detail in the examples.

Preferred hydrophobic polyols include, for example, polyethylene butylene diols, polybutylene diols, and dimer diols such as dimer acid ($C_{36}$) derivatives.

Suitable monoalcohols to be reacted with the hydrophobic isocyanate NCO-terminated prepolymers used in the preparation of the liquid, hydrophobic, non-migrating, non-functional polyurethane plasticizers of the present invention include those having a molecular weight of about 32 to about 1,000, preferably of about 128 to about 720, and an OH number of about 56 to about 1750, preferably of about 78 to about 438. Some examples of suitable monoalcohols include compounds such as linear alkyl alcohols, branched alkyl alcohols, and alkyl ester alcohols.

some examples of suitable monoalcohols include compounds such as 1-hexanol, 1-heptanol, 1-octanol, 1-nonanol, 1-decanol, 1-dodecanol, 2-ethyl-1-hexanol, 3,5,5-trimethyl-1-hexanol, 2-ethyl-1-heptanol, 2-ethyl-1-octanol, linear and branched $C_9$ to $C_{19}$ alcohols, and mixtures thereof; alkyl esters alcohols such as, 2,2,4-trimethyl-1,3-pentanediol monoisobutyrate, and mixtures thereof.

The plasticizers of the present invention are prepared by a two-step process. First the isocyanate-terminated polyether prepolymers are prepared, via any of the known methods of preparing isocyanate-terminated prepolymers, by (1) reacting (a) a diisocyanate component having an NCO group content of about 25.0% to about 60.0%, and a functionality of about 2.0, with (b) at least one hydrophobic polyol having a molecular weight of about 200 to about 4,000, an OH number of about 28 to about 561 and a functionality of from about 1.8 to about 3.0. The diisocyanate and polyether polyol are present in amounts such that the NCO:OH equivalent ratio is from about 2:1 to about 7:1, preferably about from about 3:1 to 5:1, thereby forming an isocyanate-terminated prepolymer having an NCO group content of less than about 20%.

The second step in the process of preparing the liquid, hydrophobic, non-migrating, non-functional polyurethane of the present invention comprises (2) reacting these isocyanate-terminated prepolymers, with (c) a monofunctional alcohol having a molecular weight of about 32 to about 1,000, preferably of about 128 to about 720, and an OH number of about 56 to about 1750, preferably of about 78 to about 438.

Suitable polyisocyanates which may be used in the process of producing a polyurethane comprising reacting a polyisocyanate with an isocyanate-reactive component in the presence of the plasticizers described above in accordance with the present invention include, for example, monomeric diisocyanates, NCO prepolymers, and preferably liquid polyisocyanates and polyisocyanate adducts. Suitable monomeric diisocyanates may be represented by the formula $R(NCO)_2$ in which R represents an organic group obtained by removing the isocyanate groups from an organic diisocyanate having a molecular weight of about 56 to 1,000, preferably about 84 to 400. Diisocyanates preferred for the process according to the invention are those represented by the above formula in which R represents a divalent aliphatic, hydrocarbon group having 4 to 12 carbon atoms, a divalent cyclo-aliphatic hydrocarbon group having 6 to 13 carbon atoms, a divalent aralphatic hydrocarbon group having 7 to 20 carbon atoms or a divalent aromatic hydrocarbon group having 6 to 18 carbon atoms. Preferred monomeric diisocyanates are those wherein R represents an aromatic hydrocarbon group.

Examples of the suitable organic diisocyanates include 1,4-=tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3- and -1,4-diisocyanate, 1-isocyanato-2-isocyanatomethyl cyclopentane, 1-isocyanato-3-isocyanatomethyl-3,5,5-trimethyl-cyclohexane (isophorone diisocyanate or IPDI), bis(4-isocyanatocyclohexyl) methane, 2,4'-dicyclohexylmethane diisocyanate, 1,3- and 1,4-bis(isocyanatomethyl) cyclohexane, bis(4-isocyanato-3-methyl-cyclohexyl) methane, α,α,α',α'-tetramethyl-1,3- and/or -1,4-xylylene diisocyanate, 1-isocyanato-1-methyl-4(3)-isocyanatomethyl cyclohexane, 2,4- and/or 2,6-hexahydrotoluene diisocyanate, 1,3- and/or 1,4-phenylene diisocyanate, 2,4- and/or 2,6-toluene diisocyanate, 2,4'- and/or 4,4'-diphenylmethane diisocyanate, 1,5-diisocyanato naphthalene and mixtures thereof. Aromatic polyisocyanates containing 3 or more isocyanate groups such as 4,4',4"-triphenylmethane triisocyanate and polymethylene poly (phenylisocyanates) obtained by phosgenating aniline/formaldehyde condensates may also be used.

In accordance with the present invention, at least a portion of the polyisocyanate component may be present in the form of an NCO prepolymer or a polyisocyanate adduct. Suitable polyisocyanate adducts are those containing isocyanurate, uretdione, biuret, urethane, allophanate, carbodiimide and/or oxadiazinetrione groups. The polyisocyanate adducts have an average functionality of 2.0 to 4 and an NCO content of 5 to 30% by weight. Suitable adducts/prepolymers include the following type of components:

1) Isocyanurate group-containing polyisocyanates which may be prepared as set forth in DE-PS 2,616,416, EP-OS 3,765, EP-OS 10,589, EP-OS 47,452, U.S. Pat. No. 4,288,586 and U.S. Pat. No. 4,324,879. The isocyanato-isocyanurates generally have an average NCO functionality of 3 to 4.0, preferably of from 3.2 to 3.6, and an NCO content of 5 to 30%, preferably 10 to 25% and most preferably 15 to 25% by weight.

2) Uretdione diisocyanates which may be prepared by oligomerizing a portion of the isocyanate groups of a diisocyanate in the presence of a, i.e., trialkyl phosphone catalyst and which may be used in admixture with other aromatic, aliphatic and/or cycloaliphatic polyisocyanates, particularly the isocyanurate group-containing polyisocyanates set forth under (1) above.

3) Biuret group-containing polyisocyanates which may be prepared according to the processes disclosed in U.S. Pat. Nos. 3,124,6054; 3,358,010; 3,644,490; 3,862,973; 3,906,126; 3,903,127; 4,051,165; 4,147,714; or U.S. Pat. No. 4,220,749 by using co-reactants such as water, tertiary alcohols, primary and secondary monoamines, and primary and/or secondary diamines. These polyisocyanates preferably have an NCO content of 18 to 22% by weight and an average NCO functionality of 3 to 3.5.

4) Urethane group-containing polyisocyanates which may be prepared in accordance with the process disclosed in U.S. Pat. No. 3,183,112 by reacting excess quantities of polyisocyanates, preferably diisocyanates, with low molecular weight glycols and polyols having molecular weights of less than 400, such as tripropylene glycol, trimethylol propane, glycerine, 1,2-dihydroxy propane and mixtures thereof. The urethane group-containing polyisocyanates have a most preferred NCO content of 12 to 20% by weight and an (average) NCO functionality of 2.0 to 3.

5) Allophanate group-containing polyisocyanates which may be prepared according to the processes disclosed in U.S. Pat. Nos. 3,769,318, 4,160,080 and U.S. Pat. No. 4,177,342. The allophanate group-containing polyisocyanates have a most preferred NCO content of 12 to 29% by weight and an (average) NCO functionality of 2 to 4.

6) Isocyanurate and allophanate group-containing polyisocyanates which may be prepared in accordance with the processes set forth in U.S. Pat. Nos. 5,124,427, 5,208,334 and U.S. Pat. No. 5,235,018; the disclosures of which are herein incorporated by reference.

7) Carbodiimide group-containing polyisocyanates which may be prepared by oligomerizing di- or polyisocyanates in the presence of known carbodiimidization catalysts as described in DE-PS 1,092,007, U.S. Pat. No. 3,152,162 and DE-OS 2,504,400, 2,537,685 and 2,552, 350.

Preferred polyisocyanate adducts are the polyisocyanates containing urethane groups, isocyanurate groups, biuret groups or mixtures of isocyanurate and allophanate groups.

The NCO prepolymers, which may also be used as the polyisocyanate component in accordance with the present invention, are prepared from the previously described polyisocyanates or polyisocyanate adducts, preferably monomeric diisocyanates, and organic compounds containing at least two isocyanate-reactive groups, preferably at least two hydroxy groups. These organic compounds include high molecular weight compounds having molecular weights of 300 to about 5,000, preferably 400 to about 3,000, and optionally low molecular weight compounds with molecular weights below 300. The molecular weights are number average molecular weights ($M_n$) and are determined by end group analysis (OH number). Products obtained by reacting polyisocyanates exclusively with low molecular weight compounds are polyisocyanate adducts containing urethane groups and are not considered to be NCO prepolymers.

It is preferred that the polyisocyanates of the present invention are aromatic polyisocyanates. Some examples of suitable aromatic polyisocyanates are 1,3- and/or 1,4-phenylene diisocyanate, 2,4-and/or 2,6-toluene diisocyanate, 2,4'- and/or 4,4'-diphenylmethane diisocyanate, 1,5-diisocyanato naphthalene and mixtures thereof.

Among the polyisocyanates suitable for the presently claimed invention are polymethylene poly(phenylisocyanate) compositions having a functionality of from about 2.1 to about 3.5, preferably 2.2 to 3.2 and most preferably of 2.3 to 2.8, and an NCO group content of about 26% to about 33.4%, preferably about 30.5% to about 33%, and a monomeric diisocyanate content of from about 20% to about 90% by weight, preferably from about 40% to about 80%, where in the content of monomeric diisocyanate comprises up to about 5% by weight of the 2,2'-isomer, from about 1 to about 25% by weight of the 2,4'-isomer, and from about 25 to about 70% by weight of the 4,4'-isomer, based on the entire weight of the isocyanate composition. The polymeric MDI content of these isocyanates varies from about 10 to about 80% by weight, preferably from about 20% to about 60% by weight.

"Polymeric MDI" as used herein, refers to polymethylene poly(phenyl-isocyanate) which in addition to monomeric diisocyanate (i.e., two-ring compounds) contains three-ring and higher ring containing products.

Also suitable are mixtures of polyisocyanate compositions as described above with adducts of MDI including, for example, allophanates of MDI as described in, for example, U.S. Pat. Nos. 5,319,053, 5,319,054 and U.S. Pat. No. 5,440,003, the disclosures of which are herein incorporated by reference; urethanes of MDI as described in, for example, U.S. Pat. Nos. 5,462,766 and 5,558,917, the disclosures of which are herein incorporated by reference; and carbodiimides of MDI as described in, for example, U.S. Pat. Nos. 2,853,473, 2,941,966, 3,152,162, 4,088,665, 4,294,719 and U.S. Pat. No. 4,244,855, the disclosures of which are herein incorporated by reference.

Isocyanate prepolymers used in the process of producing a polyurethane comprising reacting a polyisocyanate with an isocyanate-reactive component in the presence of the plasticizers described hereinabove include, for example, those based on diphenylmethane diisocyanate which may be based on either polyethers or polyesters are suitable for the present invention. These compounds include, for example, an isocyanate-terminated prepolymer having an NCO content of about 4–23%, and a functionality of about 2. Such prepolymers can be prepared by, for example, reacting 2,4'-isomer rich MDI with a difunctional polyether (prepared from propylene glycol and propylene oxide).

Other isocyanates include, for example, cycloaliphatic diisocyanates. Suitable cycloaliphatic diisocyanates include compounds such as, for example, 4,4'-dicyclohexylmethane diisocyanate and isophorone diisocyanate, and mixtures thereof.

Suitable isocyanate-reactive components to be used in the process of producing a polyurethane comprising reacting a polyisocyanate with an isocyanate-reactive component in the presence of the plasticizer described in the present invention, include, for example, compounds containing at least one of the groups selected from the group consisting of hydroxy groups and amine groups, and having an average functionality of from 1 to 4, preferably from about 2 to 3, and a molecular weight of about 500 to 10,000, preferably from about 1,000 to 8,000. Examples of suitable types of compounds to be used include the polyethers, polyesters, polythioethers, polyacetals, polycarbonates, and amine terminated polyethers containing from 1 to 4 isocyanate-reactive groups of the type known for the production of polyurethanes.

The high molecular weight polyethers suitable for use in accordance with the invention are known and may be obtained, for example, by polymerizing tetrahydrofuran or epoxides such as, for example, ethylene oxide, propylene oxide, butylene oxide, styrene oxide or epichlorohydrin in the presence of suitable catalysts, such as, for example, $BF_3$ or KOH, or by chemically added these epoxides, preferably ethylene oxide and propylene oxide, in admixture or successively to components containing reactive hydrogen atoms such as water, alcohols or amines. Examples of suitable alcohols and amines include the low molecular weight chain extenders set forth hereinafter, propylene glycol, glycerin, ethylene glycol, triethanolamine, water, trimethylolpropane, bisphenol A, sucrose, aniline, ammonia, ethanolamine and ethylene diamine. The polyethers could contain substantial amounts of primary hydroxyl groups in terminal positions (greater than 80% by weight, based on all of the terminal hydroxyl groups present in the polyether).

Polyether polyols are preferably used as the isocyanate-reactive component in the present process of producing a polyurethane with a plasticizer as described herein. Preferred polyethers include, for example, those compounds based on di- or tri-functional starters such as, for example, water, ethylene glycol, propylene glycol, glycerin, trimethylolpropane, or triethanolamine. These preferred compounds include copolymers of ethylene oxide and propylene oxide with no more than 15% by weight of the oxides being ethylene oxides.

Suitable examples of high molecular weight polyesters include, for example, the reaction products of polyhydric, preferably dihydric alcohols (optionally in the presence of trihydric alcohols), with polyvalent, preferably divalent, carboxylic acids. Instead of using the free carboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic, and/or heterocyclic and may be unsaturated or substituted, or example, by halogen atoms. The polycarboxylic acids and polyols used to prepare the polyesters are known and described for example in U.S. Pat. Nos. 4,098,731 and 3,726,952, herein incorporated by reference in their entirety. Suitable polythioethers, polyacetals, polycarbonates and other polyhydroxyl compounds are also disclosed in the above-identified U.S. patents. Finally, representatives of the many and varied compounds which may be used in accordance with the invention may be found, for example, in High Polymers, Volume XVI, "Polyurethanes, Chemistry and Technology," by Saunders-Frisch, Interscience Publishers, New York, London, Vol. I, 1962, pages 32–42 and 44–54, and Volume II, 1964, pages 5–6 and 198–199; and in Kunststoff-Handbuch, Vol. VII, Vieweg-Hochtlen, Carl Hanser Verlag, Munich, 1966, pages 45–71.

Also suitable are so-called amine terminated polyethers containing primary or secondary aromatically or aliphatically bound amino groups, wherein amino end groups can also be attached to the polyether chain through urethane or ester groups. These amine terminated polyethers can be prepared by any of several methods known in the art. For example, amine terminated polyethers can be prepared from polyhydroxyl polyether (e.g., polypropylene glycol ethers) by the reaction with ammonia in the presence of Raney nickel and hydrogen (Belgian Patent No. 634,741). Polyoxyalkylene polyamines can be prepared by reaction of the corresponding polyol with ammonia and hydrogen in the presence of a nickel, copper, chromium catalyst (U.S. Pat. No. 3,654,370). The preparation of polyethers containing amino end groups by the hydrogenation of cyanoethylated polyoxypropylene ethers is described in Germany Patent 1,193,671. Other methods for the preparation of polyoxyalkylene (polyether) amines are described in U.S. Pat. Nos. 3,155,728 and 3,236,895 and in French Patent No. 1,551,605. French Patent No. 1,466,708 discloses the preparation of polyethers containing secondary amino end groups. Also useful are the polyether polyamines described in U.S. Pat. Nos. 4,396,729, 4,433,067, 4,444,910 and U.S. Pat. No. 4,530,941.

Aminopolyethers obtained by the hydrolysis of compounds containing isocyanate end groups can be employed herein. For example, in a process disclosed in German Offenlegungsschrift 1,948,419, polyethers containing hydroxyl groups (preferably two or three hydroxyl groups) react with polyisocyanate groups are then hydrolyzed in a second step to amino groups. Preferred amine terminated polyethers are prepared by hydrolyzing an isocyanate compound having an isocyanate group content of from 0.5 to 40% by weight. The most preferred polyethers are prepared by first reacting a polyether containing two or four hydroxyl groups with an excess of an aromatic polyisocyanate to form an isocyanate terminated prepolymer and then converting the isocyanate groups to amino groups by hydrolysis. Processes for the production of useful amine terminated polyethers using isocyanate hydrolysis techniques are described in U.S. Pat. Nos. 4,396,218, 4,456,730, 4,472,568, 4,501,873, 4,515,923, 4,525,534, 4,540,720, 4,578,500 and U.S. Pat. No. 4,565,645; European Patent 097,299; and German Offenlegungsschrift 2,948,419, all the disclosures of which are herein incorporated by reference. Similar products are also described in U.S. Pat. Nos. 4,506,039, 4,525,590, 4,532,266, 4,532,317, 4,532,317, 4,723,032, 4,724,252, 4,855,504 and U.S. Pat. No. 4,931,595, the disclosures of which are herein incorporated by reference. The amine terminated polyethers used in the present invention are in many cases mixtures with any of the above-mentioned compounds.

In another embodiment, the isocyanate-reactive component used to produce a polyurethane product may be a polyhydroxyl compound which comprises: i) a dispersion of a polyurea and/or polyhydrazodicarbonamide in a relatively high molecular weight organic compound containing at least two hydroxyl groups, ii) a polymer polyol prepared by polymerizing an ethylenically unsaturated monomer or monomers in a relatively high molecular weight organic compound containing at least two hydroxyl groups, or iii) blends thereof. It is possible to use these types of polyols either alone, or in conjunction with the conventional polyethers described hereinabove.

These types of polyols are known, and can be characterized as hydroxyl containing compounds which contain high molecular weight polyadducts, polycondensates, or polymers in finely dispersed or dissolved form. Such polymers may be obtained by polyaddition reactions (for example, reactions between polyisocyanates and aminofunctional compounds) and polycondensation reactions (for example, between formaldehyde and phenols and/or amines) in situ in the hydroxyl group containing compound. Such processes are described in, for example, German Auslegeschriften 1,168,075 and 1,260,142, the disclosures of which are herein incorporated by reference, and in German Offenlegungsschriften 2,324,134, 2,423,984, 2,512,385, 2,513,815, 2,550,796, 2,550,797, 2,550,833, 2,550,862, 2,633,293, and 2,639,254, the disclosures of which are herein incorporated by reference. See also U.S. Pat. Nos. 3,325,421, 4,042,537, 4,089,835, 4,293,470, 4,296,213, 4,374,209, and U.S. Pat.

No. 4,786,706, the disclosures of which are herein incorporated by reference. Polyols of this type are commercially available from Bayer Corporation and Bayer AG. Also useful are the so-called polymer polyols obtained by polymerizing one or more ethylenically unsaturated monomers in a hydroxy group containing compound. Polyols modified by vinyl polymers, of the type formed, for example, by polymerizing styrene or acrylonitrile in the presence of polyether polyol are also suitable, as are polybutadienes containing OH groups. Such polymer polyols are described in U.S. Pat. Nos. 3,383,351, 3,304,273, 3,523,093, 3,110,685, and RE 28,715 and 29,118, and German Patent 1,152,536, the disclosures of which are herein incorporated by reference. Polymer polyols are commercially available from Bayer AG, BASF, and Union Carbide.

The preferred PHD polyols include, for example, the polyurea of toluene diisocyanate and hydrazine dispersed in polyether polyol, and the preferred polymer polyols include, for example, those based on the monomers styrene and acrylonitrile.

In addition the isocyanate-reactive compound used in the process to produce polyurethane products which contain the polyurethane plasticizers of the present invention as described above, typically contains at least one chain extender and/or crosslinking agent that may contain hydroxyl groups, amine groups, or both, which is used in combination with the relatively high molecular weight, isocyanate-reactive components described above. Suitable relatively low molecular weight compounds generally have molecular weights of from about 60 to less than 500, and contain from 1 to 4, preferably from 2 to 3 isocyanate-reactive groups.

Suitable chain extenders and/or crosslinking agents according to the invention include, for example, diols and triols such as, for example, 2-methyl-1,3-propanediol, ethylene glycol, 1,2- and 1,3-propanediol, 1,3- and 1,4- and 2,3-butane-diol, 1,6-hexanediol, 1,10-decanediol, diethylene glycol, triethylene glycol, tetraethylene glycol, dipropylene glycol, tripropylene glycol, neopentyl glycol, pentaerythritol, cyclohexanedimethanol, 2,2,4-trimethylpentane-1,3-diol, trimethylol propane, glycerol, 1,4-ethoxy(β-hydroxybenzene), and mixtures thereof. Preferred diols include, for example, 1,4-butanediol, ethylene glycol, diethylene glycol, trimethylol propane, 1,4-ethoxy (β-hydroxybenzene), and mixtures thereof.

Suitable aminoalcohols to be used as crosslinking agents include, for example, diethanolamine, triethanolamine, diisopropanolamine, N-methyl diethanolamine, monoisopropanolamine, monoethanolamine, etc.

Suitable amine compounds to be used as crosslinking agents in accordance with the invention include organic primary amines and secondary amines such as, for example, 2-methyl-1,5-pentane diamine, ethylene diamine, 1,3-diamino-porpane, 1,3-diaminobutane, 1,4-diaminobutane, isophorone-diamine, diamino-cyclohexane, hexamethylenediamine, methylimobis-(propyl-amine), iminobis(propyl-amine), bis(aminopropyl)piperazine, aminoethyl piperazine, bis-(p-aminocyclohexyl)-methane, mixtures thereof, and the like.

Other suitable amines include, for example, 1,8-p-diamino-methane, bis(4-amino-3-methylcyclohexyl) methane, bis(4-amino-3,5-dimethylcyclohexyl) methane, bis(4-amino-2,3,5-trimethylcyclohexyl)methane, 1,1-bis(4-aminocyclohexyl)propane, 2,2-(bis(4-aminocyclohexyl) propane, 1,1-bis(4-aminocyclohexyl)ethane, 1,1-bis(4-aminocyclohexyl) butane, 2,2-bis(4-aminocyclohexyl) butane, 1,1-bis(4-amino-3-methylcyclohexyl) ethane, 2,2-bis(4-amino-3-methylcyclohexyl)propane, 1,1-bis(4-amino-3,5-dimethylcyclohexyl)ethane, 2,2-bis(4-amino-3,5-dimethylcyclohexyl) propane, 2,2-bis(4-amino-3,5-dimethylcyclohexyl)butane, 2,4-diaminodicyclohexylmethane, 4-aminocyclohexyl-4-amino-3-methylcyclohexylmethane, 4-amino-3,5-dimethylcyclohexyl-4-amino-3-methylcyclohexylmethane, and 2-(4-aminocyclohexyl)-2-(4-amino-3-methylcyclohexyl)methane.

It is also possible to use the so-called amine-terminated polyethers having low molecular weights. Suitable amine terminated polyethers include, for example, those containing primary or secondary, aromatically or aliphatically bound amino groups, wherein amino end groups can also be attached to the polyether chain through urethane or ester groups. Suitable compounds include, for example, Jeffamine D-400 and Jeffamine D-230, which are commercially available from Huntsman Chemical Corporation.

These low molecular weight amine-terminated polyethers can be prepared by any of several methods known in the art. For example, amine-terminated polyethers can be prepared from polyhydroxyl polyether (e.g., polypropylene glycol ethers) by a reaction with ammonia in the presence of Raney nickel and hydrogen (Belgian Patent No. 634,741). Polyoxyalkylene polyamines can be prepared by reaction of the corresponding polyol with ammonia and hydrogen in the presence of a nickel, copper, or chromium catalyst (U.S. Pat. No. 3,654,370). The preparation of polyethers containing amino end groups by the hydrogenation of cyanoethylated polyoxypropylene ethers is described in Germany Patent 1,193,671. Other methods for the preparation of polyoxyalkylene (polyether) amines are described in U.S. Pat. Nos. 3,155,728 and 3,236,895 and in French Patent No. 1,551,605. French Pat. No. 1,466,708 discloses the preparation of polyethers containing secondary amine end groups. Also useful are the polyether polyamines described in U.S. Pat. Nos. 4,396,729, 4,433,067, 4,444,910 and U.S. Pat. No. 4,530,941.

Aminopolyethers obtained by the hydrolysis of compounds containing isocyanate end groups can also be employed herein. For example, in a process disclosed in German Offenlegungsschrift 2,948,419, polyethers containing hydroxyl groups (preferably two or three hydroxyl groups) react with polyisocyanate groups are then hydrolyzed in a second step to amino groups. The preferred polyethers are prepared by first reacting a polyether containing two or four hydroxyl groups with an excess of an aromatic polyisocyanate to form an isocyanate terminated prepolymer and then converting the isocyanate groups to amino groups by hydrolysis.

Processes for the production of useful amine terminated polyethers using isocyanate hydrolysis techniques are described in U.S. Pat. Nos. 4,386,218, 4,456,730, 4,472,568, 4,501,873, 4,515,923, 4,525,534, 4,540,720, 4,578,500 and U.S. Pat. No. 4,565,645; European Patent 097,299; and German Offenlegungsschrift 2,948,419, all the disclosures of which are herein incorporated by reference. Similar products are also described in U.S. Pat. Nos. 4,506,039, 4,525,590, 4,532,266, 4,532,317, 4,723,032, 4,724,252, 4,855,504 and 4,931,595, the disclosures of which are herein incorporated by reference.

The amine terminated polyethers used in the present invention are in many cases mixtures with any of the above-mentioned compounds.

Other suitable amines to be used for crosslinking agents in the present invention include, for example, aromatic diamines such as, for example 1-methyl-3,5-diethyl-2,4- diamino benzene (i.e., DETDA), 1-methyl-3,5-diethyl-2,6-diamino benzene (i.e., DETDA), 1,3,5-trimethyl-2,4-diamino benzene, 1,3,5-triethyl-2,4-diamino benzene, 3,5,3',5'-tetraethyl-4,4'-diamino diphenylmethane, 3,5,3'5'-tetraisopropyl-4,4'-diamino diphenylmethane, 3,5-diethyl-3,5-diisopropyl-4,4'-diamino diphenyl-methane, 3,3'-diethyl-5,5'-diisopropyl-4,4'-diamino diphenyl-methane, 1-methyl-2,6-diamino-3-isopropylbenzene, 1-methyl-3,5-dithioethyl-2,4-diamino benzene and/or 1-methyl-3,5-dithioethyl-2,6 diamino benzene (ETHACURE 300), and mixtures of the above diamines, such as, for example, mixtures of 1-methyl-3,5-diethyl-2,4-diamino benzene and 1-methyl-3,5-diethyl-2,6-diamino benzene.

Preferred compounds containing amine groups to be used in the present invention as crosslinking agents include monoethaneolamine, DETDA, and ETHACURE 300.

It is also possible that the low-molecular weight crosslinking agents include at least one organic crosslinker such as, for example, organic polyols and/or organic amines containing greater than 2 isocyanate-reactive groups, preferably 3 to 8 isocyanate-reactive groups, and most preferably 3 isocyanate-reactive groups. Examples of such compounds include, for example, diethanolamine, triethanolamine, trimethylolpropane, glycerol, diisopropanolamine, mixtures thereof, and the like. Alkoxylated polyols of the above mentioned starter compounds are also suitable crosslinkers.

The polyurethanes produced by reacting a polyisocyanate component and an isocyanate-reactive component in the presence of the liquid, hydrophobic, non-migrating, non-functional polyurethane plasticizers are easy to process due to the fact that the polyurethane plasticizer can be added to the polyisocyanate component, or it can be added to the isocyanate-reactive component. It also can be added as a separate addition stream. These plasticizers exhibit less migration from the resultant polyurethane elastomer products than conventional plasticizers (i.e., octyl phthalate) do. The presence of the plasticizers of the present invention retains the elastomer properties upon aging vs. standard plasticizers such as dioctyl phthalate, which tend to lose elastomer properties upon aging.

The preparation of the polyurethane elastomer described in the present invention can involve the three separate addition stream reaction of (A) an organic polyisocyanate component, with (B) an isocyanate-reactive component, and (C) a non-reactive liquid polyurethane plasticizer. The process may also be a four separate addition stream reaction, when the isocyanate-reactive component comprises two separate addition streams, one being a relatively high molecular weight isocyanate-reactive component, and the other being a lower molecular weight isocyanate-reactive component such as, for example, a crosslinking agent and/or a chain extender.

Preferably, the liquid, hydrophobic polyurethane plasticizer is premised with the polyisocyanate component, and/or with the isocyanate-reactive component. In embodiments in which the isocyanate-reactive component is added as two separate reactants wherein one is a high molecular weight component, and one is a low molecular weight component, the plasticizer component may be added to either or both of the isocyanate-reactive components in the process scheme.

The one-shot polyurethane elastomer of this invention contains from 5 to 90% by weight, preferably 10–50% by weight, of the liquid, hydrophobic polyurethane containing plasticizer. The NCO:OH equivalent ratio of the organic polyisocyanate to the total of isocyanate-reactive groups in the isocyanate-reactive component (whether present as one component or two components) is from about 0.90:1 to about 1.10:1, preferably about 1.01:1 to about 1.05:1.

The following examples further illustrate details for the preparation and use of the compositions of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all parts and percentages are parts by weight and percentages by weight, respectively.

EXAMPLES

The following components were used to prepare plasticizers:

Isocyanate A: an isomeric mixture of diphenylmethane diisocyanate having an NCO group content of about 33.6% and containing about 55% by weight of the 2,4'-isomer and about 45% by weight of the 4,4'-isomer Isocyanate B: 2,4-toluene diisocyanate having an NCO group content of about 48.3%

Isocyanate C: 3-isocyanatomethyl-3,5,5-trimethylcyclohexyl-isocyanate having an NCO group content of about 37.8%

Polyol A: a liquid $C_{36}$ dimer alcohol (i.e., dimer diol) having an OH number of about 185 and a molecular weight of about 606; commercially available from Henkel Corp. as Emergy H-1075

Alcohol A: a saturated branched chain isostearyl ($C_{18}$) fatty alcohol, having an OH number of 193, a molecular weight of about 291 and a water content of about 0.04% by weight; commercially available as Emergy H-3060 from Henkel corp.

Alcohol B: 2,2,4-trimethyl-1,3-entanediol monoisobutyrate having a molecular weight of about 216 and a freezing point of about –50° C.; commercially available as Texanol Ester Alcohol from Eastman Chemical Alcohol C: 2-ethyl-1-hexanol having a molecular weight of 128

The liquid, hydrophobic, non-migrating, non-functional polyurethane plasticizers were prepared using a two (2) step process in a reactor equipped with a stirrer and a thermocouple to read reaction temperatures. The reaction was conducted under a dry nitrogen blanket. In the first step, the diisocyanate component was charged to the reactor and heated under agitation to 50° C. Subsequently, the hydrophobic polyol, preheated to 50 to 80° C., was added. Next, the material was heated to 80° C. and maintained at that temperature for 3 to 5 hours. The % NCO of the resultant isocyanate terminated hydrophobic prepolymer was determined. The results are shown in Table 1.

In the second step, the isocyanate-terminated prepolymer from Table 1 was then cooled to about 50° C. The amount of alcohol necessary to completely react with the isocyanate-terminated prepolymer (NCO:OH=1:1) was determined for each example. This amount of alcohol (at room temperature) was added to the isocyanate-terminated prepolymer as quickly as possible while maintaining the reaction temperature between 50 and 80° C. Cooling was applied to the flask as necessary to maintain the temperature between 50 and 80° C. Then, the reaction mixture was heated to 80° C. and maintained at that temperature for about 3 to 5 hours, until all the isocyanate was reacted. This was determined by using isocyanate indicator paper. The results are shown in Table 2.

TABLE 1

NCO-Terminated Hydrophobic Polyurethane Prepolymers

| Example | Iso | Polyol | % Iso by Weight | % Polyol by Weight | Appearance at 25° C. | % NCO | Viscosity at 25° C. (mPa · s) |
|---|---|---|---|---|---|---|---|
| Prepolymer 1 | B | A | 58.9% | 41.1% | Liquid | 18.58% | 7340 |
| Prepolymer 2 | B | A | 58.9% | 41.1% | Liquid | 18.58% | 7340 |
| Prepolymer 3 | B | A | 58.9% | 41.1% | Liquid | 18.58% | 7340 |
| Prepolymer 4 | A | A | 67.4% | 32.6% | Liquid | 17.11% | 2310 |
| Prepolymer 5 | C | A | 64.7% | 35.3% | Liquid | 18.52% | 2740 |

TABLE 2

Hydrophobic Polyurethane Plasticizers

| Example | Iso Table 1 | Polyol Table 1 | Alcohol | Prepolymer (Table 1) | % by Wt Iso/Polyol Prepolymer (Table 1) | % by Wt. Alcohol | NCO:OH ratio (Prep.: Alcohol) | Appearance at 25° C. | Viscosity (mPa · s) at 50° C. |
|---|---|---|---|---|---|---|---|---|---|
| 1 | B | A | B | Prepolymer 1 | 46.03 | 53.97 | 1:1 | Liquid | 94,560 |
| 2 | B | A | C | Prepolymer 2 | 59.04 | 40.96 | 1:1 | Liquid | 56,620 |
| 3 | B | A | A | Prepolymer 3 | 38.82 | 61.17 | 1:1 | Liquid | 12,850 |
| 4 | A | A | A | Prepolymer 4 | 44.39 | 55.61 | 1:1 | Liquid | 10,710 |
| 5 | C | A | A | Prepolymer 5 | 42.45 | 57.55 | 1:1 | Liquid | 1,570 |

The preparation of polyurethane elastomers containing liquid, hydrophobic, non-migrating, non-functional polyurethane plasticizers:

The following components were used in the preparation of the polyurethane elastomers:
Polyol B: a glycerin initiated polypropylene oxide/polyethylene oxide (87:13 wt. ratio) polyether polyol having a functionality of about 3 and an OH number of about 28
Diol A: 1,4-butanediol
Isocyanate D: a modified diphenylmethane diisocyanate-terminated polyether prepolymer based on polypropylene ether glycol (PPG), having an NCO group content of 21.7%

The hydrophobic polyurethane elastomers in Table 3 were prepared using a hand cast procedure. The formulation was as follows:

| | |
|---|---|
| Polyol B: | 172.7 parts by weight |
| Diol A: | 19.2 parts by weight |
| Plasticizer: | 74.0 parts by weight |
| Dibutyltin dilaurate: | 20 ppm |
| Isocyanate D: | 104.1 parts by weight |

The weight of the catalyst (dibutyltin dilaurate) in the formulation was based on the total weight of the polyol, diol, and plasticizer in the formulation.

The polyol, the diol, the plasticizer and the catalyst described above were weighed into a suitable vessel and then degassed in a vacuum heating oven at 25–50° C. until free of bubbles. Then, Isocyanate D (pre-degassed) was added to the vessel and stirred for 30–60 seconds. The reaction mixture was then poured into a steel mold. The elastomer was removed from the mold in ca. 15 minutes to 4 hours, and placed in a 100° C. oven for 16 hours. After the elastomer was stored at 25° C. for 5 days, the elastomer properties were determined. These properties of the resultant elastomers are shown in Table 4.

The degree of migration of the hydrophobic polyurethane plasticizer described in the present invention and the non-urethane plasticizer, dioctyl phthalate, in a polyurethane elastomer formulation were determined and are shown in Table 5. An extraction method as an accelerated test on the plasticizer containing polyurethane elastomers was used to determine the migration rate. A 4"×1"×⅛" section of the polyurethane elastomer was weighed and placed in a tube of a Soxlet extractor. The elastomer was extracted with xylene for 1 hour. The sample was left overnight at room temperatures and then placed in a vacuum dissicator for 3 hours to remove any excess xylene. The dried sample was reweighted and the percent loss of plasticizer was determined.

Non-migrating plasticizers as used herein are defined as those plasticizers which lose less than 50% by weight, based on the total weight of the plasticizer, in a polyurethane elastomer under the extraction method as described hereinabove.

TABLE 3

Polyurethane Elastomer Containing Hydrophobic Polyurethane Plasticizers

| Example | Plasticizer (Table 2) | Iso (Table 1) | Polyol (Table 1) | Alcohol (Table 2) | Processing Temp ° C. | Pot Life, Mins. |
|---|---|---|---|---|---|---|
| 6 | Dioctyl Phthlate | — | — | — | — | 10' 00" |
| 7 | Example 3 | B | A | A | 50 | 3' 10" |
| 8 | Example 5 | C | A | A | 50 | 3' 20" |

TABLE 4

Elastomer Properties

| Example (Table 3) | Hardness Shore A | Tensile (psi) | Elongation (%) | Elongation Set (%) | Tear Die C (pli) | Bayshore Rebound (%) |
|---|---|---|---|---|---|---|
| Example 6 | 62 | 1,200 | 340 | 10 | 70 | 60 |
| Example 7 | 56 | 1,300 | 450 | 21 | 90 | 44 |
| Example 8 | 58 | 1,184 | 440 | 23 | 100 | 36 |

TABLE 5

Plasticizer Migration Properties (as determined by xylene extraction)

| Example (Table 3) | Plasticizer (Table 2) | Iso (Table 1) | Polyol (Table 1) | Alcohol (Table 2) | Plasticizer Migration (% wt. Loss)* |
|---|---|---|---|---|---|
| Example 6 | Dioctyl Phthlate | — | — | — | 70% |
| Example 7 | Example 3 | B** | A** | A | 29% |
| Example 8 | Example 5 | C** | A** | A | 32% |

*based on the total amount of plasticizer in the polyurethane elastomer
**refers to the Isocyanate and Polyol used to make the plasticizer in Examples 3 and 5

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A liquid, hydrophobic, non-migrating, non-functional polyurethane plasticizer having a viscosity of less than about 100,000 mPa·s at 50° C., and comprising the reaction product of
(1) an isocyanate prepolymer having an NCO group content of less than 20% and which comprises the reaction product of:
   (a) a diisocyanate component having an NCO group content of about 25.0 to about 60.0%, and a functionality of about 2.0,
   and
   (b) at least one hydrophobic polyol having a molecular weight of about 200 to about 4,000, an OH number of about 28 to about 561 and a functionality of from about 1.8 to about 3.0;
and
(2) a monofunctional alcohol having a molecular weight of about 32 to about 1,000, and an OH number of about 56 to about 1750,
wherein components (1) and (2) are present in equivalent ratios.

2. The plasticizer of claim 1, wherein compounds (1)(a) said diisocyanate and (1)(b) said hydrophobic polyol are present in amounts such that the NCO:OH equivalent ratio is from about 2:1 to about 7:1.

3. The plasticizer of claim 1, wherein the resultant plasticizers have a carbon to oxygen ratio of at least 6:1.

4. The plasticizer of claim 1, wherein (1)(a) said diisocyanate has an NCO group content of about 32 to about 50%.

5. The plasticizer of claim 1, wherein (1)(a) said diisocyanate has a viscosity of less than about 1,000 mPa·s at 25° C.

6. The plasticizer of claim 1, wherein (1)(a) said diisocyanate comprises diphenylmethane diisocyanate.

7. The plasticizer of claim 6, wherein the diphenylmethane diisocyanate comprises from about 50–60% by weight of the 2,4'-isomer and from about 40–50% by weight of the 4,4'-isomer.

8. The plasticizer of claim 1, wherein component (1)(b) said hydrophobic polyol has a molecular weight of about 400 to about 2,000, an OH number of about 56 to about 280, and a functionality of about 2.0 to about 2.2.

9. The plasticizer of claim 1, wherein compound (2) said monofunctional alcohol has a molecular weight of about 128 to about 720 and an OH number of about 78 to about 438.

10. The plasticizer of claim 1, wherein component (2) said monofunctional alcohol has a molecular weight of about 128 to about 300 and an OH number of about 187 to 438.

11. The plasticizer of claim 1, wherein components (1)(a) said diisocyanate and (1)(b) said hydrophobic polyol are present in relative amounts such that the NCO:OH ratio is from about 3:1 to about 5:1.

12. The plasticizer of claim 1, wherein the viscosity is less than about 20,000 mPa·s at 50° C.

13. A process for the preparation of liquid, hydrophobic, non-migrating, non-functional polyurethane plasticizer having a viscosity of less than about 100,000 mPa·s at 50° C., comprising:
(1) reacting
   (a) a diisocyanate component having an NCO group content of about 25.0% to about 60.0%, and a functionality of about 2.0.
   with
   (b) at least one hydrophobic polyol having a molecular weight of about 200 to about 4,000, an OH number of about 28 to about 561, and a functionality of from about 1.8 to about 3.0, to form an isocyanate-terminated prepolymer having an NCO group content of less than 20%,
and
(2) reacting the isocyanate-terminated prepolymer formed in (1), with
   (c) a monofunctional alcohol having a molecular weight of about 32 to about 1,000, and an OH number of about 56 to about 1750,
wherein the isocyanate-terminated prepolymer and the monofunctional alcohols are present in equivalent ratios.

14. The process of claim 13, wherein components (1)(a) said diisocyanate and (1)(b) said hydrophobic polyol are present in amounts such that the NCO:OH equivalent ratio is from about 2:1 to about 7:1.

15. The process of claim 13, wherein the resultant plasticizers have a carbon to oxygen ratio of at least 6:1.

16. The process of claim 13, wherein (1)(a) said diisocyanate has an NCO group content of about 32 to about 50%.

17. The process of claim 13, wherein (1)(a) said diisocyanate has a viscosity of less than about 1,000 mPa·s at 25° C.

18. The process of claim 13, wherein (1)(a) said diisocyanate comprises diphenylmethane diisocyanate.

19. The process of claim 18, wherein the diphenylmethane diisocyanate comprises from about 50–60% by weight of the 2,4'-isomer and from about 40–50% by weight of the 4,4'-isomer.

20. The process of claim 13, wherein component (1)(b) said hydrophobic polyol has a molecular weight of about 400 to about 2,000, an OH number of about 56 to about 280, and a functionality of about 2.0 to about 2.2.

21. The process of claim 13, wherein component (2) said monofunctional alcohol has a molecular weight of about 128 to about 720 and an OH number of about 78 to about 438.

22. The process of claim 13, wherein component (2) said monofunctional alcohol has a molecular weight of bout 128 to about 300 and an OH number of about 187 to 438.

23. The process of claim 13, wherein components (1)(a) said diisocyanate and (1)(b) said hydrophobic polyol are present in relative amounts such that the NCO:OH ratio is from about 3:1 to about 5:1.

24. The process of claim 13, wherein the plasticizer has a viscosity of less than about 20,000 mPa·s at 50° C.

25. A process for the production of a polyurethane elastomer comprising reacting (A) a polyisocyanate component with (B) an isocyanate-reactive component in the presence of (C) a plasticizer, wherein the plasticizer comprises the liquid, hydrophobic, non-migrating, non-functional polyurethane plasticizer of claim 1.

26. The process of claim 25, wherein (B) said isocyanate-reactive component comprises (i) one or more high molecular weight polyols and/or (ii) one or more low molecular weight chain extenders.

27. The process of claim 26, wherein (B)(i) said high molecular weight polyols have a functionality of from about 1 to about 4 and a molecular weight of about 500 to about 10,000; and (B)(ii) said low molecular weight chain extenders have a functionality of about 1 to 4 and a molecular weight of about 60 to less than about 500.

28. The process of claim 26, wherein (B)(i) said higher molecular weight polyols have a functionality of about 2 to about 3 and a molecular weight of about 1,000 to about 8,000.

29. The process of claim 26, wherein (B)(i) said high molecular weight polyols are selected from the group consisting of polyether polyols and polyester polyols.

30. The polyurethane elastomer produced by the process of claim 25.

31. A polyurethane elastomer produced by reacting a polyisocyanate component with an isocyanate-reactive component in the presence of the plasticizer of claim 1, wherein the plasticizer is present in an amount of less than 50% by weight, based on the total weight of the polyurethane elastomer.

* * * * *